United States Patent
Burger et al.

(10) Patent No.: US 9,703,565 B2
(45) Date of Patent: *Jul. 11, 2017

(54) COMBINED BRANCH TARGET AND PREDICATE PREDICTION

(71) Applicant: The Board of Regents of the University of Texas System, Austin, TX (US)

(72) Inventors: Douglas C. Burger, Redmond, WA (US); Stephen W. Keckler, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,300

(22) Filed: Mar. 25, 2015

(65) Prior Publication Data
US 2015/0199199 A1    Jul. 16, 2015

Related U.S. Application Data

(63) Continuation of application No. 13/321,807, filed as application No. PCT/US2010/039162 on Jun. 18, 2010, now Pat. No. 9,021,241.

(51) Int. Cl.
*G06F 9/30* (2006.01)
*G06F 9/38* (2006.01)
*G06F 9/455* (2006.01)

(52) U.S. Cl.
CPC ........ *G06F 9/3806* (2013.01); *G06F 9/30058* (2013.01); *G06F 9/30072* (2013.01);
(Continued)

(58) Field of Classification Search
CPC .. G06F 9/30072; G06F 9/3842–9/3848; G06F 9/30058; G06F 9/3804
See application file for complete search history.

(56) References Cited

U.S. PATENT DOCUMENTS 5,317,734 A    5/1994  Gupta
5,615,350 A    3/1997  Hesson
(Continued)

FOREIGN PATENT DOCUMENTS

JP    2001175473 A    6/2001
JP    2002149401 A    5/2002
JP    2013500539 A    1/2013

OTHER PUBLICATIONS

"Explicit Data Graph Execution," accessed at https://web.archive.org/web/20090831160248/http://en.wikipedia.org/wiki/Explicit_Data_Graph_Execution, last modified on Aug. 28, 2009, pp. 5.
(Continued)

*Primary Examiner* — Andrew Caldwell
*Assistant Examiner* — Jyoti Mehta
(74) *Attorney, Agent, or Firm* — Klarquist Sparkman, LLP

(57) ABSTRACT

Embodiments provide methods, apparatus, systems, and computer readable media associated with predicting predicates and branch targets during execution of programs using combined branch target and predicate predictions. The predictions may be made using one or more prediction control flow graphs which represent predicates in instruction blocks and branches between blocks in a program. The prediction control flow graphs may be structured as trees such that each node in the graphs is associated with a predicate instruction, and each leaf associated with a branch target which jumps to another block. During execution of a block, a prediction generator may take a control point history and generate a prediction. Following the path suggested by the prediction through the tree, both predicate values and branch targets may be predicted. Other embodiments may be described and claimed.

26 Claims, 10 Drawing Sheets

(52) U.S. Cl.
CPC .............. *G06F 9/38* (2013.01); *G06F 9/3804* (2013.01); *G06F 9/3836* (2013.01); *G06F 9/45516* (2013.01)

(56) References Cited

U.S. PATENT DOCUMENTS

| | | | |
|---|---|---|---|
| 5,669,001 A | 9/1997 | Moreno | |
| 5,729,228 A | 3/1998 | Franaszek et al. | |
| 5,790,822 A | 8/1998 | Sheaffer et al. | |
| 5,796,997 A | 8/1998 | Lesartre et al. | |
| 5,845,103 A | 12/1998 | Sodani et al. | |
| 5,903,750 A | 5/1999 | Yeh et al. | |
| 5,905,893 A | 5/1999 | Worrell | |
| 5,943,501 A | 8/1999 | Burger et al. | |
| 6,016,399 A | 1/2000 | Chang | |
| 6,061,776 A | 5/2000 | Burger et al. | |
| 6,161,170 A | 12/2000 | Burger et al. | |
| 6,164,841 A | 12/2000 | Mattson et al. | |
| 6,178,498 B1 | 1/2001 | Sharangpani et al. | |
| 6,240,510 B1 | 5/2001 | Yeh et al. | |
| 6,282,708 B1 | 8/2001 | Augusteijn et al. | |
| 6,314,493 B1 | 11/2001 | Luick | |
| 6,353,883 B1 | 3/2002 | Grochowski et al. | |
| 6,493,820 B2 | 12/2002 | Akkary et al. | |
| 6,513,109 B1 | 1/2003 | Gschwind et al. | |
| 6,529,922 B1 | 3/2003 | Hoge | |
| 6,662,294 B1 | 12/2003 | Kahle et al. | |
| 6,892,292 B2 | 5/2005 | Henkel et al. | |
| 6,918,032 B1 | 7/2005 | Abdallah et al. | |
| 6,965,969 B2 | 11/2005 | Burger et al. | |
| 6,988,183 B1 | 1/2006 | Wong | |
| 7,032,217 B2 | 4/2006 | Wu | |
| 7,085,919 B2 | 8/2006 | Grochowski et al. | |
| 7,095,343 B2 | 8/2006 | Xie et al. | |
| 7,299,458 B2 | 11/2007 | Hammes | |
| 7,302,543 B2 | 11/2007 | Lekatsas et al. | |
| 7,380,038 B2 | 5/2008 | Gray | |
| 7,487,340 B2 | 2/2009 | Luick | |
| 7,571,284 B1 | 8/2009 | Olson | |
| 7,624,386 B2 | 11/2009 | Robison | |
| 7,676,650 B2 | 3/2010 | Ukai | |
| 7,676,669 B2 | 3/2010 | Ohwada | |
| 7,836,289 B2 | 11/2010 | Tani | |
| 7,853,777 B2 | 12/2010 | Jones et al. | |
| 7,877,580 B2 | 1/2011 | Eickemeyer et al. | |
| 7,917,733 B2 | 3/2011 | Kazuma | |
| 7,970,965 B2 | 6/2011 | Kedem et al. | |
| 8,055,881 B2 | 11/2011 | Burger et al. | |
| 8,055,885 B2 | 11/2011 | Nakashima | |
| 8,127,119 B2 | 2/2012 | Burger et al. | |
| 8,180,997 B2 | 5/2012 | Burger et al. | |
| 8,181,168 B1 | 5/2012 | Lee et al. | |
| 8,201,024 B2 | 6/2012 | Burger et al. | |
| 8,250,555 B1 | 8/2012 | Lee et al. | |
| 8,312,452 B2 | 11/2012 | Neiger et al. | |
| 8,321,850 B2 | 11/2012 | Bruening et al. | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,583,895 B2 | 11/2013 | Jacobs et al. | |
| 8,817,793 B2 | 8/2014 | Mushano | |
| 9,043,769 B2 | 5/2015 | Vorbach | |
| 2001/0032308 A1 | 10/2001 | Grochowski et al. | |
| 2002/0016907 A1 | 2/2002 | Grochowski et al. | |
| 2002/0095666 A1 | 7/2002 | Tabata et al. | |
| 2003/0023959 A1 | 1/2003 | Park | |
| 2003/0088759 A1* | 5/2003 | Wilkerson .......... | G06F 9/30072 712/218 |
| 2003/0128140 A1 | 7/2003 | Xie et al. | |
| 2004/0083468 A1 | 4/2004 | Ogawa et al. | |
| 2004/0216095 A1 | 10/2004 | Wu | |
| 2005/0172277 A1 | 8/2005 | Chheda et al. | |
| 2005/0204348 A1 | 9/2005 | Horning et al. | |
| 2006/0090063 A1 | 4/2006 | Theis | |
| 2007/0239975 A1 | 10/2007 | Wang | |
| 2007/0288733 A1 | 12/2007 | Luick | |
| 2008/0028183 A1 | 1/2008 | Hwu et al. | |
| 2008/0109637 A1 | 5/2008 | Martinez et al. | |
| 2009/0013135 A1 | 1/2009 | Burger et al. | |
| 2009/0013160 A1 | 1/2009 | Burger et al. | |
| 2009/0031310 A1 | 1/2009 | Lev et al. | |
| 2009/0106541 A1 | 4/2009 | Mizuno et al. | |
| 2009/0158017 A1 | 6/2009 | Mutlu et al. | |
| 2009/0172371 A1 | 7/2009 | Joao et al. | |
| 2010/0146209 A1 | 6/2010 | Burger et al. | |
| 2010/0161948 A1 | 6/2010 | Abdallah | |
| 2010/0191943 A1 | 7/2010 | Bukris | |
| 2010/0325395 A1 | 12/2010 | Burger et al. | |
| 2011/0060889 A1 | 3/2011 | Burger et al. | |
| 2011/0072239 A1 | 3/2011 | Burger et al. | |
| 2011/0078424 A1 | 3/2011 | Boehm et al. | |
| 2011/0202749 A1 | 8/2011 | Jin et al. | |
| 2012/0158647 A1 | 6/2012 | Yadappanavar et al. | |
| 2012/0246448 A1 | 9/2012 | Abdallah | |
| 2012/0303933 A1 | 11/2012 | Manet et al. | |
| 2012/0311306 A1 | 12/2012 | Mushano | |
| 2013/0198499 A1 | 8/2013 | Dice et al. | |

OTHER PUBLICATIONS

"Very long instruction word," accessed at https://web.archive.org/web/20090429032447/http://en.wikipedia.org/wiki/Very_long_instruction_word, last modified on Apr. 27, 2009, pp. 5.

August, D. I., et al., "Architectural Support for Compiler-Synthesized Dynamic Branch Prediction Strategies: Rationale and Initial Results," Third International Symposium on High-Performance Computer Architecture, pp. 84-93 (Feb. 1-5, 1997).

International Search Report and Written Opinion for International Application No. PCT/US10/39162, mailed on May 6, 2011, 10 pages.

McDonald, R., et al., "The Design and Implementation of the TRIPS Prototype Chip," HotChips, The University of Texas at Austin, pp. 1-24 (Aug. 17, 2005).

Ranganathan, N., "Control Flow Speculation for Distributed Architectures," Dissertation presented to the faculty of the Graduate School of the University of Texas at Austin, pp. 1-40 (May 2009).

Simon, B. et al., "Incorporating Predicate Information Into Branch Predictors," In proceedings of the 9th International Symposium on High Performance Computer Architecture, pp. 1-12 (Feb. 2003).

Office Action Issued in Korean Patent Application No. 10-2015-7010585, Mailed Date: Apr. 1, 2016, 3 pages.

Office Action Issued in Korean Patent Application No. 10-2015-7032221, Mailed Date: Mar. 8, 2016, 4 pages. With English translation.

August, et al., "A Framework for Balancing Control Flow and Predication," Proceedings of the 30th Annual IEEE/ACM International Symposium on Microarchitecture, Dec. 1997, 12 pages.

Burger et al., "Design and Implementation of the TRIPS EDGE Architecture", In Proceedings of the 32nd Annual International Symposium on Computer Architecture, Jun. 4, 2005, pp. 1-41.

Burger et al., "Scaling to the End of Silicon with EDGE Architectures," In Proceedings of Computer, vol. 37, Issue 7, Jul. 1, 2004, pp. 44-55.

Chang et al., "Using Predicated Execution to Improve the Performance of a Dynamically Scheduled Machine with Speculative Execution," PACT '95 Proceedings of the IFIP WG10.3 working conference on Parallel architectures and compilation techniques, Jun. 1995, pp. 99-108.

Chuang et al., "Predicate Prediction for Efficient Out-of-Order Execution," Proceedings of the 17th Annual International Conference on Supercomputing, Jun. 2003, 10 pages.

Coons et al., "Optimal Huffman Tree-Height Reduction for Instruction-Level Parallelism", In Technical Report, Aug. 2008, pp. 1-26.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

(56) References Cited

OTHER PUBLICATIONS

Desikan et al., "Scalable Selective Re-Execution for EDGE Architectures," In Proceedings of the 11th International Conference on Architectural Support for Programming Languages and Operating Systems, Oct. 9, 2004, 13 pages.
Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.
Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
Ebcioglu et al., "An Eight-Issue Tree-VLIW Processor for Dynamic Binary Translation", In Proceedings of the International Conference on Computer Design, Oct. 5, 1998, 9 pages.
Fallin, et al., "The Heterogeneous Block Architecture", In Proceedings of 32nd IEEE International Conference on Computer Design, Oct. 19, 2014, pp. 1-8.
Ferrante et al., "The Program Dependence Graph and Its Use in Optimization", In Proceedings of ACM Transactions on Programming Languages and Systems, vol. 9, Issue 3, Jul. 1, 1987, pp. 319-349.
Gebhart et al., "An Evaluation of the TRIPS Computer System," In Proceedings of the 14th international conference on Architectural support for programming languages and operating systems, Mar. 7, 2009, 12 pages.
Gulati et al., "Multitasking Workload Scheduling on Flexible Core Chip Multiprocessors," In Proceedings of the Computer Architecture News, vol. 36, Issue 2, May 2008, 10 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Havanki et al., "Treegion Scheduling for Wide Issue Processors", In Proceedings of the 4th International Symposium on High-Performance Computer Architecture, Feb. 1, 1998, pp. 1-11.
Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)). 21 pages.
Huang, "Improving Processor Performance Through Compiler-Assisted Block Reuse," In Doctoral Dissertation, May 2000, 125 pages.
Huh et al., "A NUCA Substrate for Flexible CMP Cache Sharing," IEEE Transactions on Parallel and Distributed Systems, vol. 18, No. 8, Jun. 2007, 10 pages.
Ipek et al., "Core Fusion: Accommodating Software Diversity in Chip Multiprocessors", In Proceedings of the 34th annual international symposium on Computer architecture, Jun. 9, 2007, 12 pages.
Kavi, et al., "Concurrency, Synchronization, Speculation—the Dataflow Way", In Journal of Advances in Computers, vol. 96, Nov. 23, 2013, pp. 1-41.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), (2007)) 13 pages.
Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, 10 pages.
Liu, "Hardware Techniques to Improve Cache Efficiency", In Dissertation of the University of Texas at Austin, May 2009, 189 pages.
Maher et al., "Merging Head and Tail Duplication for Convergent Hyperblock Formation," In Annual IEEE/ACM International Symposium on Microarchitecture, Dec. 2006, 12 pages.
Mahlke et al, "Effective Compiler Support for Predicated Execution Using the Hyperblock," Proceedings of the 25th Annual International Symposium on Microarchitecture, Dec. 1992, pp. 45-54.
Mahlke, "Exploiting Instruction Level Parallelism in the Presence of Conditional Branches (1996)", In Doctoral Dissertation, Sep. 1996, 292 pages.
Mai et al., "Smart Memories: A Modular Reconfigurable Architecture," Proceedings of the 27th International Symposium on Computer Architecture, Jun. 14, 2000, 11 pages.
McDonald et al., "Characterization of TCC on Chip-Multiprocessors," Parallel Architectures and Compilation Techniques, 2005. PACT 2005. 14th International Conference on. IEEE, 2005, 12 pages.
McDonald et al., "TRIPS Processor Reference Manual," In Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Moreno et al., "Scalable instruction-level parallelism through tree-instructions", In Proceedings of the 11th international conference on Supercomputing, Jul. 11, 1997, 14 pages.
Munshi, et al., "A Parameterizable SIMD Stream Processor", In Proceedings of Canadian Conference on Electrical and Computer Engineering, May 1, 2005, pp. 806-811.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Netto et al., "Code Compression to Reduce Cache Accesses", In Technical Report—IC-03-023, Nov. 2003, pp. 1-14.
Office Action Issued in Korean Patent Application No. 10-2015-7010585, Mailed Date: Oct. 19, 2016, 4 pages.
Office Action Issued in Korean Patent Application No. 10-2015-7032221, Mailed Date: Oct. 19, 2016, 4 pages.
Pan, "High Performance, Variable-Length Instruction Encodings", In Doctoral Dissertation of Massachusetts Institute of Technology, May 2002, pp. 1-53.
Parcerisa; Design of Clustered Superscalar Microarchitectures, Chapter 7, Thesis, 2004, 28 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Pengfei et al., "M5 Based EDGE Architecture Modeling", In Proceedings of IEEE International Conference on Computer Design, Oct. 3, 2010, pp. 289-296.
Pengfei et al., "Novel O-GEHL Based Hyperblock Predictor for EDGE Architectures," In 2012 IEEE International Conference on Networking, Architecture and Storage (NAS), Jun. 2012, 9 pages.

(56) References Cited

OTHER PUBLICATIONS

Pierce et al., "Wrong-Path Instruction Prefetching", In Proceedings of the 29th Annual IEEE/ACM International Symposium on Microarchitecture, Dec. 2, 1996, pp. 1-17.
Pnevmatikatos et al., "Guarded Execution and Branch Prediction in Dynamic ILP Processors," Proceedings of the 21st Annual International Symposium on Computer Architecture, Apr. 1994, 11 pages.
Quiñones, et al., "Improving Branch Predication and Predicated Execution in Out-of-Order Processors," IEEE 13th International Symposium on High Performance Computer Architecture, Feb. 2007, 10 pages.
Quiñones, et al., "Selective Predicate Prediction for Out-of-Order Processors," Proceedings of the 20th Annual International Conference on Supercomputing, Jun. 2006, 9 pages.
Roesner, "Counting Dependence Predictors," In Undergraduate Honors Thesis, May 2, 2008, 25 pages.
Ros, et al., "A Hamming Distance Based VLIW/EPIC Code Compression Technique", In Proceedings of the International conference on Compilers, architecture, and synthesis for embedded systems, Sep. 22, 2004, pp. 132-139.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, "Polymorphous Architectures: A Unified Approach for Extracting Concurrency of Different Granularities", In Doctoral Dissertation of Philosophy, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sankaralingam et al., "Universal Mechanisms for Data-Parallel Architectures," In Proceedings of 36th Annual IEEE/ACM International Syposium on Microarchitecture, Dec. 2003, 12 pages.
Sethumadhavan et al., "Design and Implementation of the TRIPS Primary Memory System," In Proceedings of International Conference on Computer Design, Oct. 1, 2006, 7 pages.
Sibi et al., "Scaling Power and Performance via Processor Composability," University of Texas at Austin technical report No. TR-10-14 (2010), 20 pages.
Smith et al., "Compiling for EDGE Architectures," In Proceedings of International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Sohi et al., "High-Bandwidth Data Memory Systems for Superscalar Processors," ACM SIGOPS Operating Systems Review—Proceedings of the 4th international conference on architectural support for programming languages and operating systems Homepage, vol. 25, Apr. 1991, pp. 53-62.
Sohi et al., "Multiscalar Processors," In Proceedings of 22nd Annual International Symposium on Computer Architecture, Jun. 22-24, 1995, 12 pages.
Sohi, "Retrospective: multiscalar processors," In Proceedings of the 25th Annual International Symposium on Computer Architectures, Jun. 27-Jul. 1, 1998, pp. 1111-1114.
Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Wilson et al., "Designing High Bandwidth On-Chip Caches," ISCA '97 Proceedings of the 24th annual international symposium on Computer architecture, Jun. 1997, pp. 121-132.
Wu et al., "Block Based Fetch Engine for Superscalar Processors", In Proceedings of the 15th International Conference on Computer Applications in Industry and Engineering, Nov. 7, 2002, 4 pages.
Xie et al., "A code decompression architecture for VLIW", In Proceedings of 34th ACM/IEEE International Symposium on Microarchitecture, Dec. 1, 2001, pp. 66-75.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
Bouwens et al., "Architecture Enhancements for the ADRES Coarse-Grained Reconfigurable Array," High Performance Embedded Architectures and Compilers, Springer Berlin Heidelberg pp. 66-81 (2008).

\* cited by examiner

Fig. 1

105 Program files

110 Compiler 120
125
129

Blocks of code 140
145 Control Point History
150 Prediction Generator
155 Combined Prediction
157
160 Instruction Predictor Runtime Environment Combined Branch Target and Predicate Prediction Components Generation of Blocks of Instructions

COMBINED BRANCH TARGET AND PREDICATE PREDICTION

CROSS REFERENCE TO RELATED APPLICATIONS

This Application is a continuation of U.S. application Ser. No. 13/321,807 filed on Nov. 21, 2011. U.S. application Ser. No. 13/321,807 is the National Stage filing under 35 U.S.C. §371 of PCT/US10/39162 filed on Jun. 18, 2010. The disclosures of these applications are hereby incorporated herein by reference in their entirety.

BACKGROUND

Various techniques are available to improve dynamic prediction of conditional computer instructions during execution. Prediction of conditional instructions is often used to better select future instructions whose execution may be dependent on the outcome of the conditional instructions, or to accelerate execution of those future instructions. Among prediction techniques, branch prediction and predication are sometimes used. Branch prediction is often used when conditional instructions in a program are compiled to lead to two possible branching locations (or "targets"). Branch target prediction, used in branch predictors, may also be used to identify a nonconditional jump target. In this technique, a history of branch choices taken before execution of the current conditional instruction may be examined to predict that one branch or the other should be scheduled for execution.

In predication, sets of instructions associated with a conditional instruction are compiled to be associated with a predicate value, such as a Boolean value, and this predicate is typically evaluated separately. In this technique, two sets of instructions (based on the value of the conditional) are separately evaluated and results from those instructions whose associated predicate value was not the result after evaluation may be thrown away or discarded. Predicate values may themselves be predicted, such as by operating a prediction technique using a history of predicate values as input.

Current systems which use these techniques, and in particular systems which organize instructions into instruction blocks, suffer from difficulties, however. The use of branch prediction alone, both when predicting either results of branches or jump targets, fails to provide a facility for contemporaneous prediction of control instructions within blocks of instructions, which often takes the form of predication. Predication, conversely, is not suited to jumps across block boundaries. Existing predication techniques, which may serialize predicate predications, suffer from additional overhead as instructions with later predicates are forced to wait for earlier-occurring predicates. In systems which attempt to combine the techniques, the use of branch prediction and predicate prediction requires multiple data structures and introduces substantial execution overhead. Furthermore, in current systems, branches are predicted between blocks without knowledge of intervening predicates; these branches, which are predicted with a more sparse instruction history, can suffer from poor prediction accuracy.

SUMMARY

In one embodiment, a computer-implemented method for execution-time prediction of computer instructions may include generating, on a computing device, a combined predicate and branch target prediction based at least in part on an control point history; executing, on the computing device, one or more predicted predicated instructions based at least in part on the combined predicate and branch target prediction. The method may further include proceeding with execution on the computing device at a predicted branch target location based at least in part on the combined predicate and branch target prediction.

In another embodiment, a system for predictive runtime execution of computer instructions may include one or more computer processors, and a combined prediction generator which is configured to accept a history of predicates and/or branches as input and to generate a combined predicate and branch target prediction based on the accepted history, in response to operation by the one or more processors. The system may also include an instruction fetch and execution control configured to control the one or more processors, in response to operation by the one or more processors, to execute one or more predicated instructions based on predicted predicate values obtained from the combined predicate and branch target prediction, and to proceed with execution of fetched instructions at a predicted branch target location. The predicted branch target location may be based at least in part on the predicted predicate values.

In another embodiment, an article of manufacture may include a tangible computer-readable medium and a plurality of computer-executable instructions which are stored on the tangible computer-readable medium. The computer-executable instructions, in response to execution by an apparatus, may cause the apparatus to perform operations for scheduling instructions to execute for a first block of code having predicated instructions and one or more branch targets. The operations may include identifying a combined predicate and branch target prediction based at least in part on one or more instructions which have been previously executed. The prediction may include one or more predicted predicate values for the predicated instructions in the first block of code. The operations may also include executing, on the computing device, one or more predicted predicated instructions out of the predicated instructions in the block based at least in part on the predicted predicate values. The operations may also include predicting a predicted branch target location pointing to a second block of code, based on the predicted predicated instructions, and continuing execution with the second block of code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 illustrates a block diagram of selected components of a combined branch target and predicate prediction system.

DETAILED DESCRIPTION

Figure 2:
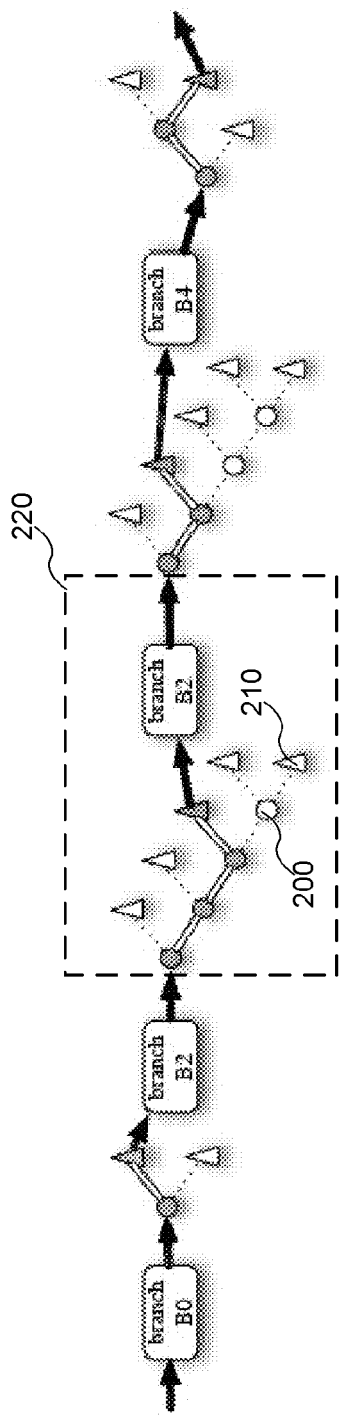
FIG. 2 illustrates a block diagram of instruction prediction based on combined branch target and predicate prediction.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The disclosure is drawn, inter alia, to methods, apparatus, systems, and computer readable media related to prediction of predicates and branch targets using combined branch target and predicate prediction.

Described embodiments include techniques, methods, apparatus, and articles of manufacture which may be associated with using a combined structure for both branch target and predicate predictions to expedite execution of a program by a computing device. In various embodiments, these predictions may be made in block-atomic architectures, or in other architectures which divide programs into predicated basic blocks of instructions. In other embodiments, the techniques described herein may be utilized in other architectures that mix branches and predicates. In various embodiments, the predictions may be made using one or more control flow graphs which represent predicates in instruction blocks and branches between blocks. During compilation, the program may be divided into blocks and the one or more prediction control flow graphs created to be associated with each block. The prediction control flow graphs may be structured as trees such that each node in the graphs is associated with a predicate, each edge with a predicated instruction, and each leaf associated with a control instruction which jumps to another block. Then, during execution of a block, a prediction generator may take a control point history, such as a history of the last n predicates, and generate a prediction. The prediction may, in various embodiments, be generated as a set of predicate values for various levels of the control flow graph—as such, the prediction may include predictions for the block's predicate instructions.

An instruction fetch and execution control, by using these predicted predicate values, may predict and schedule predicated instructions for execution according to a traversal of the tree to determine to which predicates the predictions apply. Described embodiments may also utilize the control flow graph such that traversal of the graph along the predicted predicate values leads to a leaf, and therefore a branch target. In various embodiments, branch targets may refer to conditional and/or unconditional branches which generate target instruction addresses. By performing this traversal, the instruction fetch and execution control may predict the branch target, and therefore the next code block to be executed. As such, embodiments described herein may combine prediction of predicates and branch targets through the use of a generation of a single, merged prediction. This may provide lower power and/or higher prediction accuracy compared with prior art systems and techniques.

In various embodiments, prediction generation may be made more efficient through use of parallel prediction generation techniques. The parallel prediction generation may be performed by generating a predicate value for a first predicate level based on a control point history, while also contemporaneously generating possible values for lower levels. After a suitable number of levels have been operated on, values from higher levels may be used to narrow down the possible values for lower-levels.

As an example, assume the prediction generator has a 10 predicate control point history length and is tasked with predicting three levels of predicates for a block. The prediction generator, in various embodiments, may do a lookup using a 10-bit history for the first prediction. Simultaneously, the prediction generator may perform two lookups using the most recent 9 bit history, along with the two possibilities for the result of the first lookup, to get a second level predicate value. Similarly, the prediction generator may perform four lookups for the third value. After this contemporaneous generation, the prediction generator may then select particular lower-level results based on the higher-level results and discard the rest. While this technique may require more lookups of prediction values than a sequentialized generation system, in scenarios where generation of individual predicate values has a long latency, this parallelized technique may provide for speed increases.

FIG. 1 illustrates a block diagram of selected components of a combined branch target and predicate prediction system in accordance with various embodiments. In the illustration of FIG. 1, a compiler 110 may receive one or more program files 105 for compilation into one or more executable programs. In various embodiments, the compiler 110 may operate to produce one or more blocks of executable code (hereinafter, also referred to simply as "code"), such as a block 120, which may have associated with them control flow graphs that represent predicated instructions, such as a prediction control flow graph 125, as well as branches which connect the graphs, such as a branch 129. In various embodiments, these blocks may be atomic blocks.

These blocks of code may then be executed in a runtime environment 140, which may be configured to perform predictions of predicate values and branch targets using the combined branch target and predicate predictions, to be described in more detail below. As illustrated, a prediction generator 150, to be executed as part of the runtime environment 140 may be configured to operate on control point histories, such as a control point history 145, to generate the combined branch target and predicate predictions, such as a combined prediction 155. In various embodiments, these instruction histories may include combinations of past predicate values, past branch target values, or both. In various embodiments, the prediction generator 150 may be implemented, in whole or in part, as a lookup table, which looks up one or more prediction values based on a control point history. Additionally, the prediction generator 150 may perform one or more parallelized lookups (or other predicate value generation techniques) in order to improve performance of prediction generation.

The generated combined prediction 155 may then be used by an instruction fetch and execution control 160, along with information about a block of instructions 157, to mark predicated instructions for execution as well as to predict branch targets to schedule execution of branched blocks of code. In various embodiments, the instruction fetch and execution control 160 may comprise an instruction scheduler for scheduling predicated instructions based on the combined prediction 155. In various embodiments, the instruction fetch and execution control 160 may comprise fetch control logic to predict a target based on the combined prediction 155 and to fetch an instruction for execution based on that target. Specific examples of this prediction generation and instruction prediction will be further described below. In various embodiments, the runtime environment 140 may be provided by a runtime manager or other appropriate software, which itself may be generated by the compiler 110.

FIG. 2 illustrates a block diagram of instruction prediction based on combined branch target and predicate predictions in accordance with various embodiments. As shown, for the illustrated embodiments, execution of a program may take the form of execution of one or more predicated instructions such as a predicated instruction 200, which leads to branch targets such as a branch target 210. These branch targets then indicate a next block of instructions that should be executed, along with the associated predicated instructions. In various embodiments, the combined branch target and predicate predictions utilized herein are, for a block of instructions, able to predict values for an entire block's worth of predicate values as well as a branch target out of the block. This set of predictions is illustrated by the example instructions and targets within the area bounded by the dotted line 220. The example instructions and targets include three predicted predicate values (the three shaded circles), followed by a branch target (the shaded triangle). Particular techniques for performing these predictions are described below.

Figure 3:
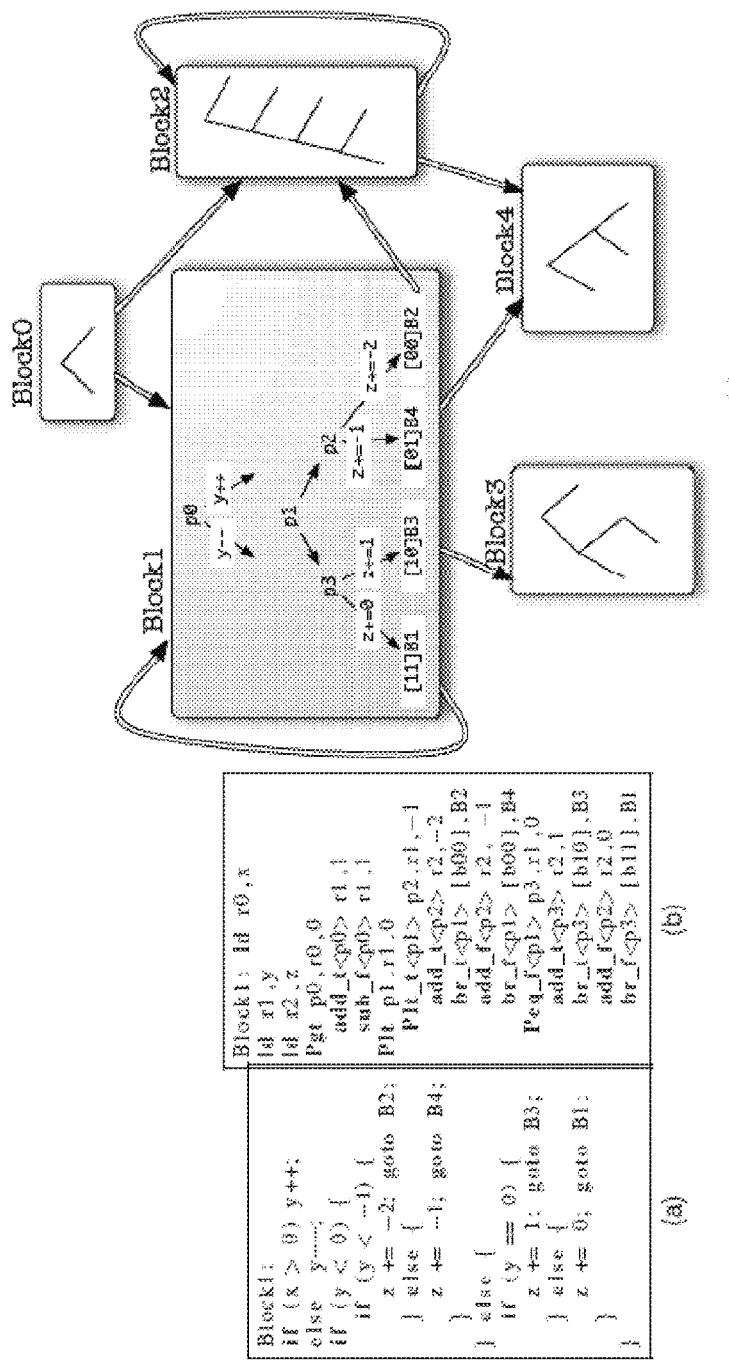
FIG. 3 illustrates a block diagram of successive levels of generation of blocks of instructions from program code.

FIG. 3 illustrates a block diagram of successive levels of generation of blocks of instructions from program code in accordance with various embodiments. Portion (a) of FIG. 3 illustrates an example C-style code snippet. The snippet contains conditionals, such as "if (x>0)" that leads to two possibilities, instructions: 1) "y++" and 2) "y--". The code also contains explicit branching instructions, such as "goto B2." These branching instructions indicate that a branch should be taken, if that branching instruction is executed.

Portion (b) of FIG. 3, illustrates intermediate representation of the code after compilation. In particular, portion 3(b) illustrates how the conditional statements in the block have been represented as predicated instructions. Thus, in the illustrated example, the result of the "if (x>0)" conditional discussed above has been represented as a predicate p0 at the line "Pgt p0, r0, 0." In this line, the value in register r0 is compared to see if the value is greater than 0, and the true-or-false result of that comparison is held as the value of predicate p0.

Next, are two possible instructions that depend on this predicate. The first is the "add_t<p0>r1, 1" instruction, which is an add operation that is predicated on the value of p0 and is executed if p0 is "true." Similarly, "sub_f<p0>r1, 1" subtracts 1 from the r1 register if the p0 predicate takes a value of false. In other words, the techniques and systems described herein provide predicted values for predicates like p0, which allow one of the predicated instructions to be scheduled before the actual value of the predicate is known, thereby potentially speeding up execution of the block.

Portion (c) of FIG. 3 illustrates an example set of blocks of instructions which may be generated by a compiler, such as the compiler 110, from the intermediate representation of portion (b). As illustrated, in particular by Block1, each block may contain a branched set of predicated instructions that leads to the branches; which, in turn, instruct the execution to jump to another block. Thus, when Block1 is executed, one more predicated instructions are performed, and then a branch to another block is taken. If branch B3 is taken, execution jumps to Block3. In various embodiments, branches may cause a block to be executed again, e.g., branch B1, which begins execution of Block1 anew. As described herein, in various embodiments, the blocks of instructions have associated with them prediction control flow graphs. The prediction control flow graphs allow an instruction fetch and execution control to predict not only which predicated instructions should be predicted and scheduled for execution within a block, but also which branches are likely to be taken and therefore with which blocks execution should proceed upon exit of a currently-executing block.

Figure 4:
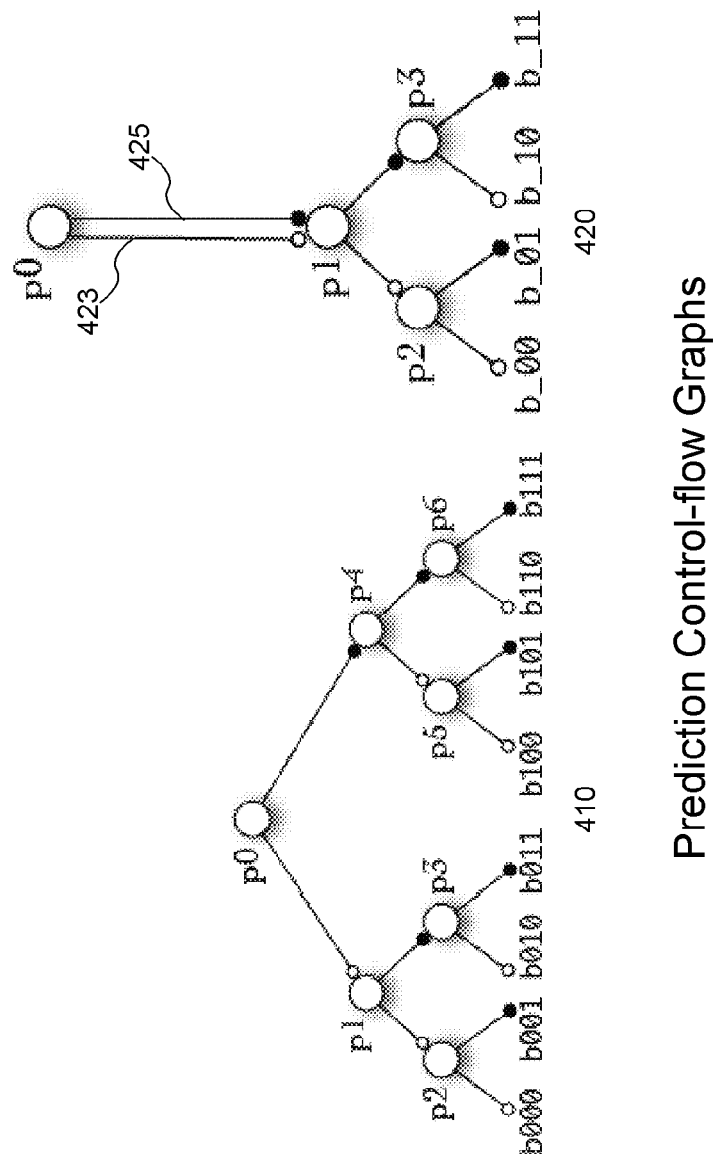
FIG. 4 illustrates a block diagram of prediction control flow graphs for code blocks.

FIG. 4 illustrates a block diagram of prediction control flow graphs for code blocks in accordance with various embodiments. As discussed, in various embodiments, the compiler may be configured to generate, for a block, a prediction control flow graph which indicates predicated instructions as well as branch targets for the particular block of instructions. As illustrated, the prediction control flow graph may be implemented as a tree which represents predicates by nodes, such as nodes p0, p1, and p5 of graph 410, and which represents branch targets as leaves, such as branch targets b100, b101, and b110. Additionally, the edges in the tree may represent predicted instructions—thus, if the value of predicate p0 is "True" the instruction represented by the edge from p0→p4 may be executed. As discussed herein, techniques described herein utilize these prediction control-flow graphs to predict both predicate values and branch targets by generating a combined branch target and predicate prediction which identifies a set of prediction values. By following the values through the graph, the runtime environment 140, and in particular the instruction fetch and execution control 160, can identify a) which predicated instructions are likely to be needed for execution, and b) what their values are. Additionally, by following the path, the instruction fetch and execution control 160 can identify a branch target for scheduling of a next block of instructions. A given control flow graph may contain paths of different lengths depending on the internal structure of a block. Thus, in various embodiments, the instruction fetch and execution control 160 may follow the path to its end at a leaf node, while in some embodiments, the instruction fetch and execution control 160 may predict a branch target based on a non-terminated following of the path, or a following of the path past its actual end.

In various embodiments, the prediction control flow graph may contain different paths for every predicate value, such as in graph 410, which branches at every predicate. In some scenarios, however, a block may not branch on a particular predicate, such as in graph 420, where, regardless of the value of p0, control for the block represented by the graph will next depend on the value of p1. This does not, however, mean that the same instruction will be executed in the block, as there are different edges 423 and 425 in the tree. Each of the different edges 423 and 425 may represent a different predicated instruction. Additionally, while the value of p0 may not be completely determinative of future instructions, in various embodiments, the value may still correlate with particular future predicate or branch target values. Thus, the value of p0 may still be maintained in a control point history for prediction generation. An example of this can be seen in the code discussed above with respect to FIG. 3, where execution in Block1 proceeded to predicate p1 regardless of which value predicate p0 took. Also, in various embodiments the prediction control flow graphs may have associated with them information about the shape of the graph, such as the number of levels in the graph or a degree of branching. This shape information may be useful in performing prediction generation, and in particular parallelized prediction generation.

Figure 5:
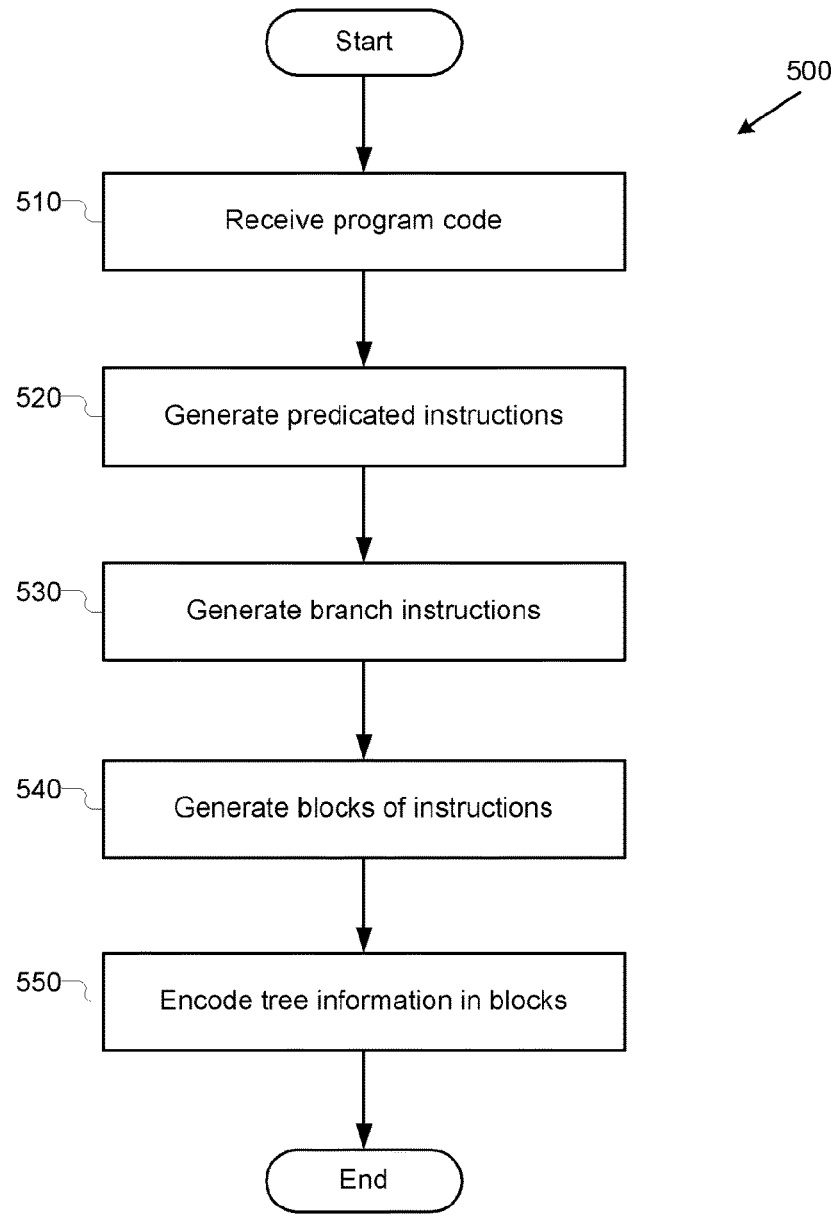
FIG. 5 illustrates a process for generating programs which utilize the combined branch target and predicate prediction.

FIG. 5 illustrates a process 500 for generating programs which utilize the combined branch target and predicate prediction in accordance with various embodiments. As illustrated, process 500 may start at operation(s) 510 ("Receive program code"). At operation(s) 510, program code to compile may be received, such as by the compiler 110. As discussed above, in various embodiments, the program code may include one or more code files, and may be implemented in a variety of known computing languages. Additionally, in various embodiments, the program code may have one or more instructions or information that aid the compiler in generating code which utilizes the prediction techniques described herein. While, for the sake of ease of description, the activities of process 500 are described with reference to a single compiler, such as compiler 110, in alternative embodiments, one or more compilers or other code analysis modules may be utilized to perform these activities.

From operation(s) 510, process 500 may proceed to operation(s) 520 ("Generate predicated instructions"). At operation(s) 520, the compiler may generate predicated instructions, such as, for example, the instructions discussed above with respect to FIG. 3. As discussed above, these predicated instructions may be generated at least in part through the compiler 110 identifying conditional statements and generating predicates based on these statements. From operation(s) 520, process 500 may proceed to operation(s) 530 ("Generate branch instructions"). At operation(s) 530, the compiler 110 may generate branch instructions, for example, the instructions discussed above with respect to FIG. 3. From operation(s) 530, process 500 may proceed to operation(s) 540 ("Generate block instructions"). At operation(s) 540, the compiler 110 may generate blocks of instructions for purposes of prediction. In various embodiments, the compiler may generate branch instructions and/or generate blocks on the basis of explicit jump calls, like those illustrated above. In other embodiments, the compiler may identify blocks present in the original program code and generate branches between these identified blocks even where no jump was originally coded. The blocks may be explicitly identified, such as in the example shown in FIG. 3, or may be recognized by the compiler as set of instructions which are likely to be executed as a unit.

From operation(s) 540, process 500 may proceed to operation(s) 550 ("Encode tree information in blocks"). At operation(s) 550, the compiler may encode tree information (or approximate tree information) for the prediction control flow graphs in the respective headers of the block of instructions associated with those prediction control flow graphs. For example, as mentioned above, the tree may represent the number of predicates on various paths between the root and various unconditional jumps as leaves. In such a tree, predicates would used in the block as nodes, predicate results/values as edges, and branch targets as leaves. In other embodiments, the compiler may encode information related to tree depth or the shape of a tree, so that, during prediction generation, the prediction generator 150 may more easily generate a proper-length prediction.

Figure 6:
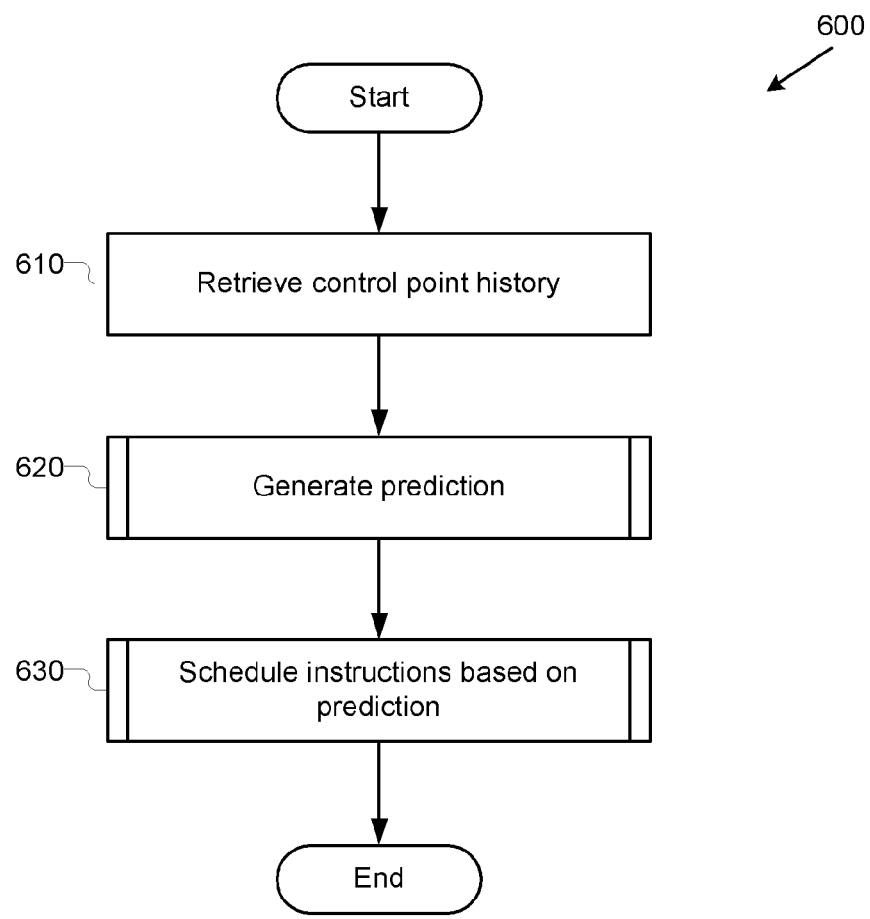
FIG. 6 illustrates a process for predicting branch targets and predicates using combined branch target and predicate prediction.

FIG. 6 illustrates a process 600 for predicting branch targets and predicates using combined branch target and predicate predictions in accordance with various embodiments. For the illustrated embodiments, the process 600 may be performed on a per-block basis, even though the illustrated example shows predictions for only a single block. In alternate embodiments, prediction may be performed on multiple blocks as needed during execution.

Accordingly, for the embodiments, process 600 may start with operation(s) 610 ("Retrieve control point history"). At operation(s) 610, the runtime environment 140, in particular, the prediction generator 150, may retrieve a control point history. In various embodiments, the control point history may include a history of predicate values which have been evaluated in the past; the history may take the form of a binary string and/or have a pre-defined length. An example may be the control point history 145 illustrated in FIG. 1. In various embodiments, the control point history may also include one or more records of branch targets taken.

From operation(s) 610, the process 600 may proceed to operation(s) 620 ("Generate prediction"). At operation(s) 620, the prediction generator 150 may use the control point history 145 to generate a prediction, such as the combined prediction 155, for use in scheduling instructions. Particular embodiments of this activity are described below with reference to FIG. 7. From operation(s) 620, process 600 may proceed to operation(s) 630. At operation(s) 630, the instruction fetch and execution control 160, using the combined prediction 155 and the block information 157, may schedule instructions for execution. Particular embodiments of this activity are described below with reference to FIG. 8.

Figure 7:
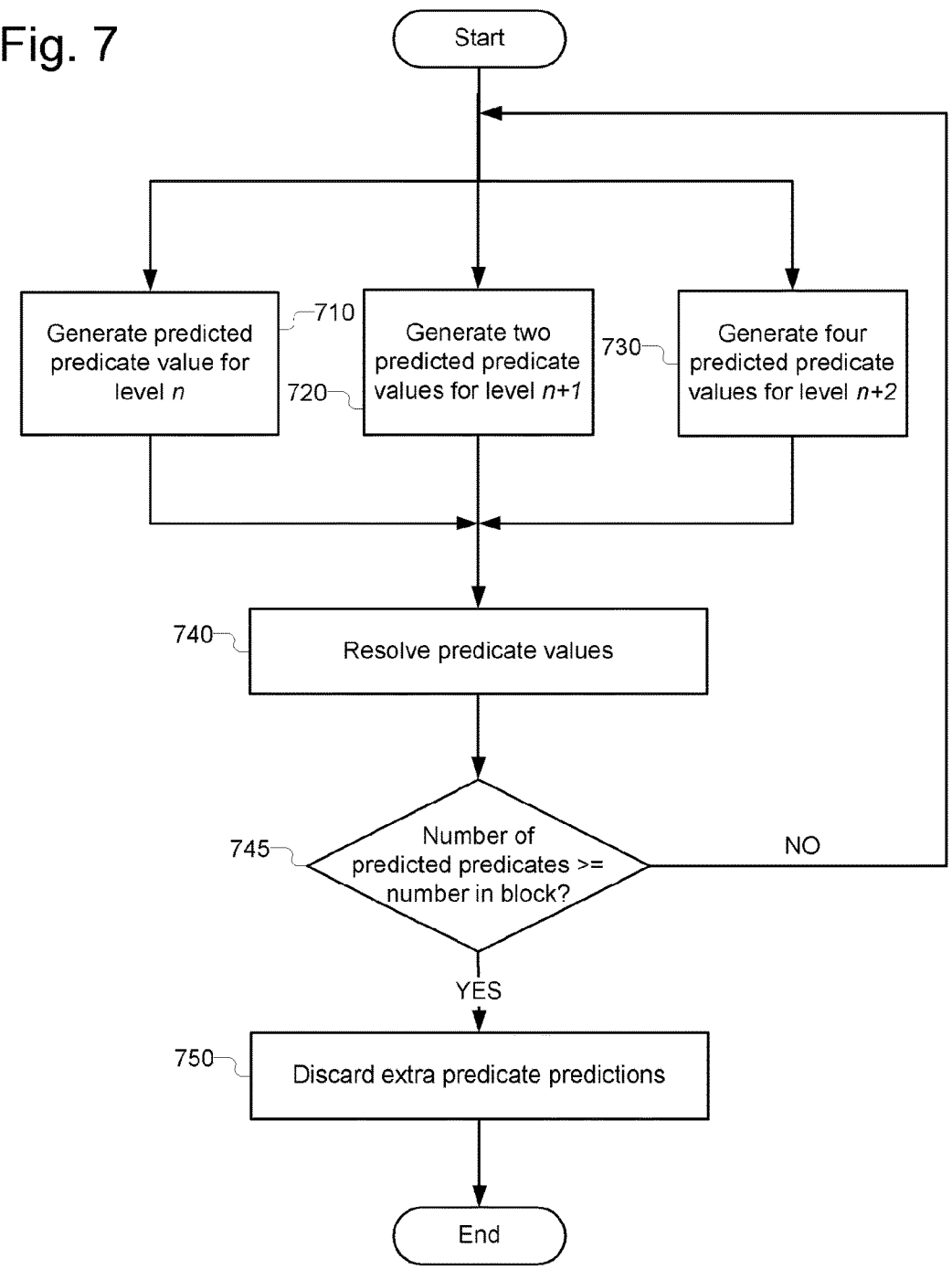
FIG. 7 illustrates a process for generating a combined branch target and predicate prediction.

FIG. 7 illustrates a process 700 for generating a combined branch target and predicate prediction in accordance with various embodiments. Similar to the discussion above with respect to FIG. 6, process 700 may be performed on a per-block basis; the illustrated example thus shows predictions for a single block. The illustrated example shows a parallelized technique for efficiently generating combined predictions. In various embodiments, not illustrated, however the prediction generator 150 may generate a prediction one value at a time by inputting the control point history, such as into a lookup table, receiving a predicate value. The prediction generator 150 may then proceed with a second lookup using all but the oldest value in the control point history, along with the freshly-generated predicate value to look up the next predicate value, and so on. The lookup may continue until enough values have been found that a combined branch target and predicate prediction for the block is generated.

As illustrated, process 700 may start at operation(s) 710 ("Generate predicted predicated value for level n"). At operation(s) 710, the prediction generator 150 may generate a predicted predicate value for a level n. As discussed above, this may be performed using various generation methods, including a lookup table. From operation(s) 710, process 700 may proceed to operation(s) 720 ("Generate two predicted predicated values for level n+1"). At operation(s) 720, the prediction generator 150 may generate two predicted predicate values for level n+1, using both possible predicate values for level n in the control point history. As illustrated, the action of this block may be performed in parallel with the action of operation(s) 710, as it does not immediately rely on the result of operation(s) 710. From operation(s) 720, process 700 may proceed to operation(s) 730 ("Generate four predicted predicated values for level n+2"). At operation(s) 720, a similar action may be performed, where the prediction generator generates four predicted predicate values for level n+2. The four predicted predicate values for level n+2 may be generated using all of the possible values for the results of operation(s) 710 and 720.

Following is an example for generating a combined branch target and predicate prediction in accordance with the described embodiments. If the prediction generator is operating on instruction histories of length 5, with a current control point history of 11011, at the operation(s) 710, the prediction generator 150 may look up a predicted value for level n using the history 11011. Simultaneously (or at least contemporaneously) with that operation, the prediction generator 150 may also perform look ups for level n│1 using instruction histories 10110 and 10111. The instruction histories may represent the four most-recent history values in the history. Additionally, the instruction histories may be associated with two possible outcomes from the generation operation(s) at operation(s) 710. Similarly, at operation(s) 730, lookups may be performed using histories 01100, 01101, 01110, and 01111.

From operation(s) 710, 720 or 730, process 700 may proceed to operation(s) 740 ("Resolve predicate values"). At operation(s) 740, after the results of operation(s) 710, 720, and 730 are known, the predicate values may be resolved. Thus, if the value from operation(s) 710 was determined to be 0, then the result from operation(s) 720 which used 10110 as input may be maintained. Other result from operation(s) 720 may be discarded. Similarly, one result may be taken from operation(s) 730. It should be recognized that, while the illustrated example utilizes three levels of parallel predicate prediction, in alternative embodiments, different numbers of levels may be used.

From operation(s) 740, process 700 may proceed to operation(s) 745 ("Number of predicted predicates greater than or equal to the number of blocks"). At operation(s) 745, the prediction generator 150 may determine if a prediction has been made for at least every predicate in the current block of instructions. If not, process 700 may return to operations 710, 720, and 730, and proceeds with n=n+3. If predictions have been made for every predicate in the block, then at operation(s) 750 ("Discard extra predicate predictions"). At operation(s) 750, the extra predictions may be discarded. For example, using the three-level parallelized prediction discussed above, if there are five levels of predicates in the block, the process may perform two iterations of the loop, and generate six predicted predicate values. The sixth value may then be discarded. Additionally, in some embodiments, if blocks contain unbalanced trees (or other complex tree shapes) in their prediction control flow graph, the prediction generator 150 may be configured to generate enough predicted predicate values to fill the longest path in a given tree. As a result, the prediction generator 150 may avoid or reduce spending computational resources looking at potentially-complex tree descriptors. This may also result in the discarding of predicate predictions at operation(s) 750.

Figure 8:
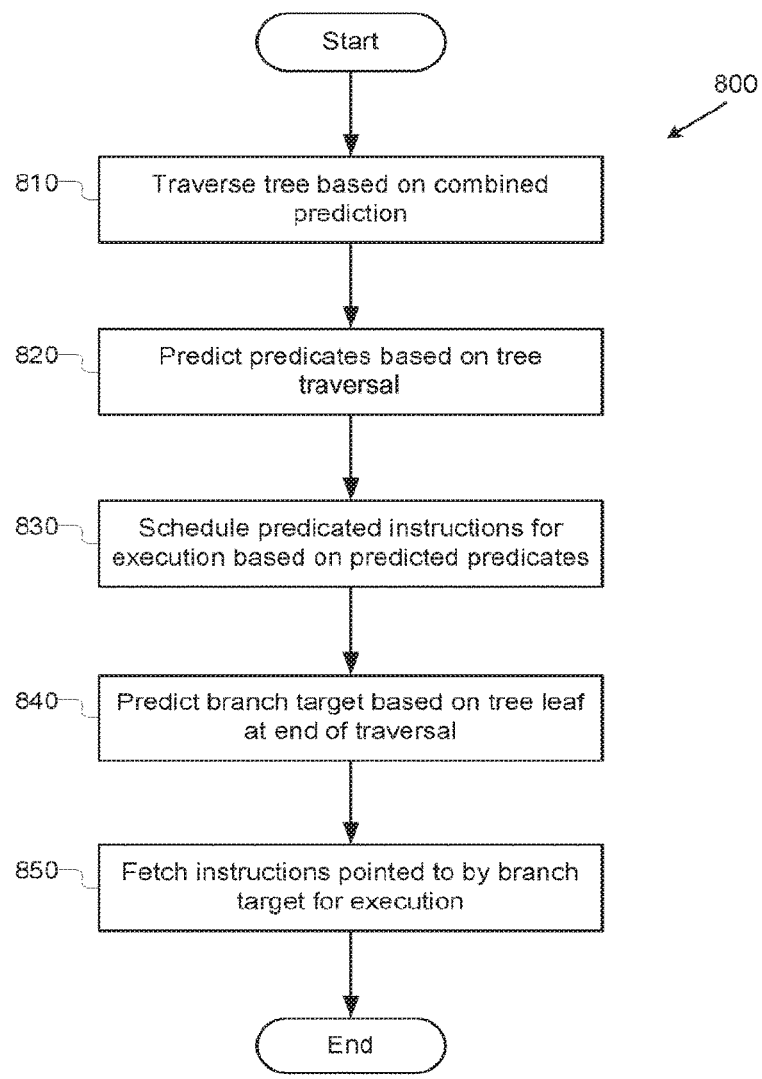
FIG. 8 illustrates a process for scheduling instructions based on combined branch target and predicate prediction.

FIG. 8 illustrates a process 800 for scheduling instructions based on combined branch target and predicate predictions in accordance with various embodiments. For the embodiments, process 800 may start at operation(s) 810 ("Traverse tree based on combined prediction"). At operation(s) 810, the instruction fetch and execution control 160 may traverse the tree of the prediction control flow graph based on the combined prediction 155. From operation(s) 810, process 800 may proceed to operation(s) 820 ("Predict predicates based on tree traversal"). At operation(s) 820, the instruction fetch and execution control may predict which predicates will be evaluated based on the path through the tree. From operation(s) 820, process 800 may proceed to operation(s) 830 ("Schedule predicated instructions for execution based on predicted predicates"). From operation(s) 830, the instruction fetch and execution control 160 may schedule predicated instructions based on these predictions for execution. From operation(s) 830, process 800 may proceed to operation(s) 840 ("Predict branch target based on tree leaf at end of traversal"). From operation(s) 840, the instruction fetch and execution control may predict a branch target based on the tree traversal. In various embodiments, the instruction fetch and execution control may predict the branch target based on a tree leaf located at the end of the tree traversal, if the traversal leads to a leaf node; in other embodiments, the prediction may be based on a non-terminating traversal. From operation(s) 840, process 800 may proceed to operation(s) 850 ("Schedule code block pointed to by branch target for execution"). From operation(s) 850, the instruction fetch and execution control 160 may fetch one or more instructions pointed to by this branch target for next execution after the current code block. As discussed above, under process 800, a single combined prediction, such as combined prediction 155, may provide sufficient information to schedule both predicated instructions and branch targets for a block of instructions. The fetched instructions may be subsequently executed.

Figure 9:
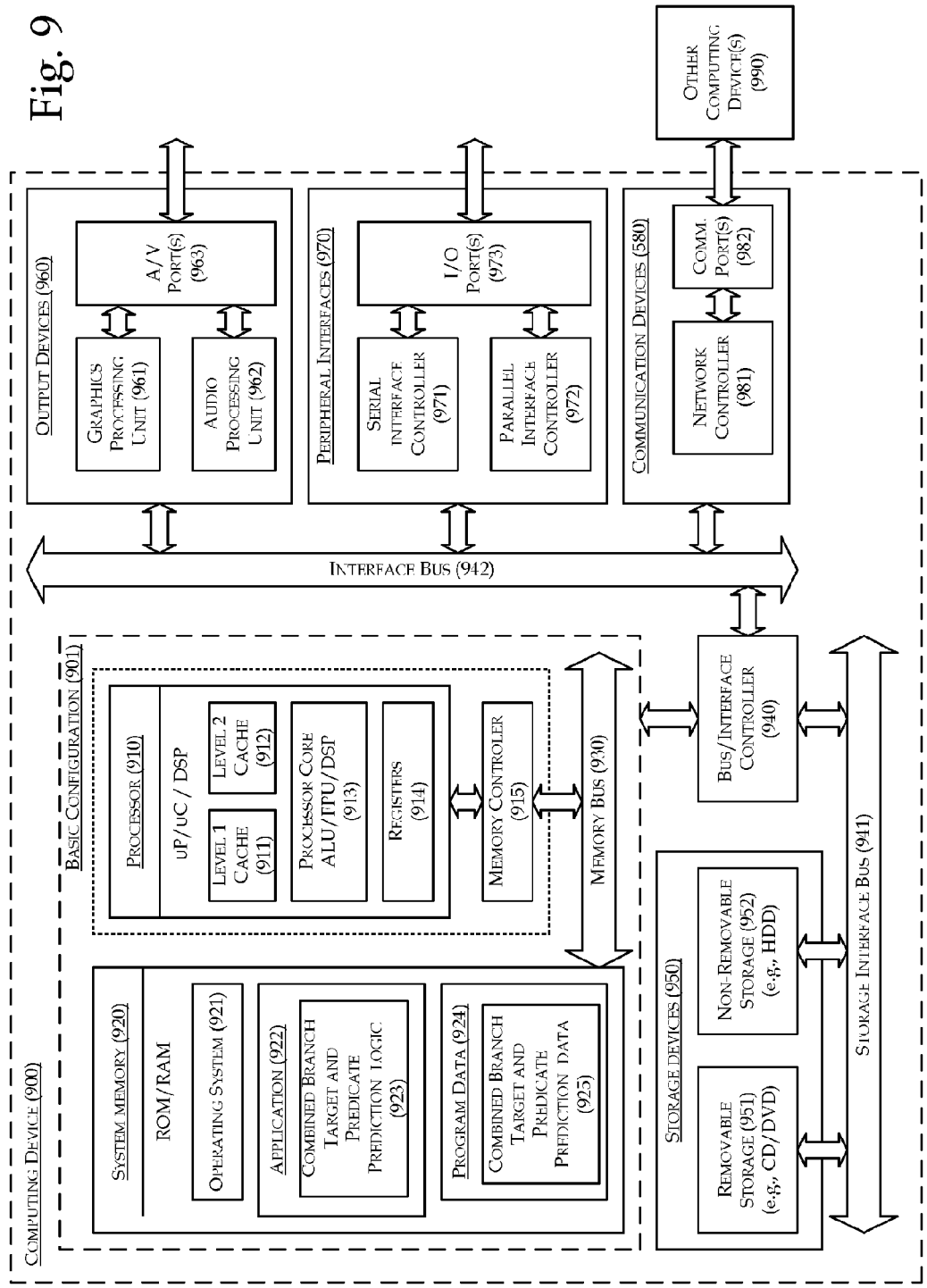
FIG. 9 illustrates an example computing device configured to practice various aspects of the earlier described methods.

FIG. 9 is a block diagram illustrating an example computing device configured in accordance with the present disclosure. In a basic configuration 901, computing device 900 typically includes one or more processors 910 and system memory 920. A memory bus 930 may be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 may include one more levels of caching, such as a level one cache 911 and a level two cache 912, a processor core 913, and registers 914. An example processor core 913 may include an arithmetic logic unit (ALU), a floating point unit (FPU), a digital signal processing core (DSP Core), or any combination thereof. An example memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include programming instructions providing logic 923 to implement the above-described combined branch target and predicate prediction generation and instruction prediction. Program Data 924 may include data 925 such as combined branch target and predicate predictions, control point history, and code block information.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which may be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which may be arranged to facilitate communications with one or more other computing devices 990 over a network communication link via one or more communication ports 982.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both tangible storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

Figure 10:
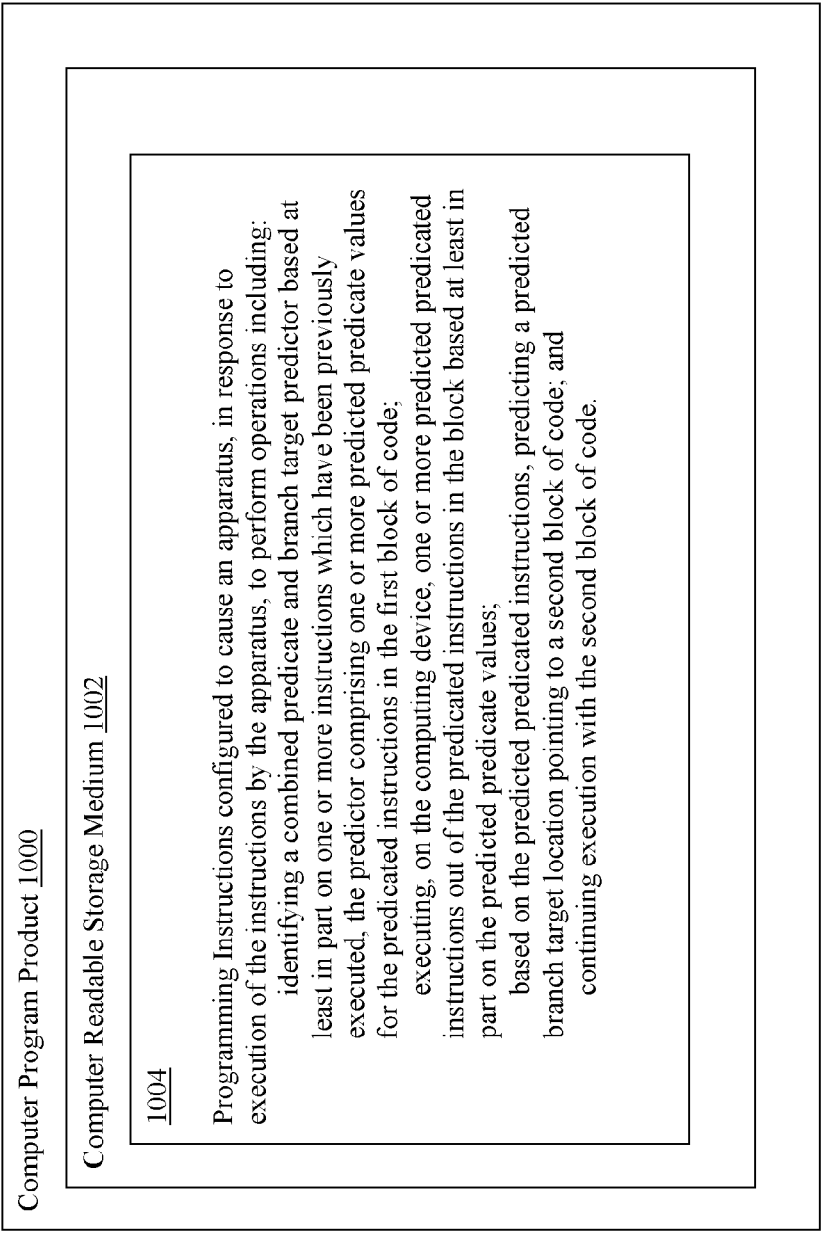
FIG. 10 illustrates an example article of manufacture having instructions configured to enable an apparatus to practice various aspects of the earlier described methods, all ranged in accordance with various embodiments of the present disclosure.

Articles of manufacture and/or systems may be employed to perform one or more methods as disclosed herein. FIG. 10 illustrates a block diagram of an example article of manufacture having a computer program product 1000 for metering usage of components of an integrated circuit, in accordance with various embodiments of the present disclosure. The computer program product 1000 may include non-transitory computer-readable storage medium 1002 and plurality of programming instructions 1004 stored in the computer-readable storage medium 1002.

In various ones of these embodiments, programming instructions 1004 may be configured to enable an apparatus, in response to execution by the apparatus, to perform operations including:

identifying a combined predicate and branch target prediction based at least in part on one or more instructions which have been previously executed, the prediction comprising one or more predicted predicate values for the predicated instructions in the first block of code;

executing, on the computing device, one or more predicted predicated instructions out of the predicated instructions in the block based at least in part on the predicted predicate values;

based on the predicted predicated instructions, predicting a predicted branch target location pointing to a second block of code; and continuing execution with the second block of code.

Computer-readable storage medium 1002 may take a variety of forms including, but not limited to, non-volatile and persistent memory, such as, but not limited to, compact disc read-only memory (CDROM) and flash memory.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Various aspects of the subject matter described herein are described using terms commonly employed by those skilled in the art to convey the substance of their work to others skilled in the art. However, it should be apparent to those skilled in the art that alternate implementations may be practiced with only some of the described aspects. For purposes of explanation, specific numbers, materials, and configurations are set forth in order to provide a thorough understanding of the illustrative examples. However, it should be apparent to one skilled in the art that alternate embodiments may be practiced without the specific details. In other instances, well-known features are omitted or simplified in order not to obscure the illustrative embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and e, etc." is used, in general such a construction is intended in the sense one having skill in the art would understand the convention (e.g., "a system having at least one of A, B, and C" would include but not be limited to systems that have A alone, B alone, C alone, A and B together, A and e together, B and e together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, Band C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A method for execution-time prediction of computer instructions, the method comprising:
    fetching and executing at least a portion of a first block of instructions;
    by a combined predicate generator circuitry, generating, based on a control point history, a combined prediction for the first block of instructions, the combined prediction comprising one or more predictions for predicated instructions of the first block of instructions and one or more branch target predictions for branch target instructions of the first block of instructions, wherein the combined prediction indicates predicted branch target locations for the first block of instructions;
    fetching at least a portion of a second block of instructions for a selected one of the predicted branch target locations; and
    proceeding with executing the at least a portion of the second block of instructions at the selected one of the predicted branch target locations based at least in part on the combined prediction.

2. The method of claim 1, wherein generating the combined prediction comprises:
    generating one or more predicted predicate values based on the control point history.

3. The method of claim 2, wherein the method further comprises predicting a branch target location based on the one or more predicted predicate values.

4. The method of claim 2, wherein generating the one or more predicted predicate values comprises generating multiple levels of the one or more predicted predicate values in parallel.

5. The method of claim 2, wherein:
    generating the one or more predicted predicate values comprises performing a lookup of a particular predicted predicate value based on use of the control point history as an index.

6. The method of claim 2, wherein the control point history further comprises one or more past predicated instructions that were previously executed during an ongoing execution by a program.

7. The method of claim 1, wherein the generating the combined prediction comprises following a path through a prediction control flow graph based at least in part on one or more predicted predicate values for the first block of instructions.

8. The method of claim 1, further comprising:
generating, a prediction control flow graph for the first block of instructions, wherein:
predicates in the first block of instructions are represented as nodes in the prediction control flow graph; and
branch targets are represented as leaves in the prediction control flow graph.

9. The method of claim 1, wherein the combined prediction is generated using encoded information for a prediction control flow graph stored in a header of the first block of instructions.

10. The method of claim 1, wherein the combined prediction is generated using encoded tree information or encoded approximate tree information for a prediction control flow graph stored in a header of the first block of instructions.

11. An apparatus comprising:
one or more processors;
a combined prediction generator circuitry configured to accept a control point history as input and to generate a combined prediction, based on the accepted control point history, wherein the combined prediction comprises one or more predictions for predicate values for predicated instructions and one or more branch target predictions for branch instructions; and
an instruction fetch and execution control circuitry configured to control the one or more processors to schedule execution of fetched instructions at a predicted branch target location, wherein the predicted branch target location is based at least in part on the combined prediction.

12. The apparatus of claim 11, wherein the instruction fetch and execution control circuitry is further configured to predict a branch target location based at least in part on the one or more predictions for predicate values, in response to operation by the one or more processors.

13. The apparatus of claim 12, further comprising:
a storage medium, coupled to the one or more processors; and
one or more prediction control flow graphs stored on the storage medium, wherein respective prediction control flow graphs are configured, for respective blocks of code, to represent predicates in the respective blocks of code as internal nodes and branches to other blocks of code as leaves.

14. The apparatus of claim 13, wherein the instruction fetch and execution control circuitry is configured to predict the branch target location by:
traversal of a path through a prediction control flow graph according to the one or more predictions for predicate values; and
after a leaf is reached by traversal of the path, predict a location of a code block branched to at the leaf as the predicted branch target location.

15. The apparatus of claim 11, wherein the combined prediction generator circuitry is configured to generate the combined prediction by use of a history of past predicate values as a lookup index to identify the one or more predictions for predicate values, in response to operation by the one or more processors.

16. The apparatus of claim 15, wherein the combined prediction generator circuitry is configured to generate the combined prediction by performance of multiple lookups in parallel, in response to operation by the one or more processors.

17. The apparatus of claim 11, wherein at least one of the predicated instructions is not a branch instruction.

18. The apparatus of claim 11, wherein at least a portion of the control point history comprises previously-evaluated predicate values stored in a lookup table of the one or more processors.

19. The apparatus of claim 11, wherein at least a portion of the control point history is stored as a balanced or an unbalanced tree.

20. The apparatus of claim 11, wherein at least a portion of the control point history is stored in a header for a block of the fetched instructions.

21. The apparatus of claim 11, wherein the control point history comprises past predicate values, past branch target predictions, or past predicate values and past branch target predictions.

22. A processor comprising:
a combined prediction generator circuitry;
an execution control circuitry configured to control the processor to schedule execution of blocks of code, wherein the processor is configured to:
with the combined prediction generator circuitry, identify a combined prediction based at least in part on one or more past predicate values, the combined prediction comprising one or more predictions for predicate values for predicated instructions in a first block of code, and a branch target prediction indicating one or more target instruction addresses for the first block of code, wherein past predicated instructions corresponding to the one or more past predicate values were executed at a first time and the combined prediction is identified at a second time;
with the execution control circuitry, schedule one or more predicted predicated instructions out of the predicated instructions in the first block of code for execution based at least in part on the one or more predictions for predicate values;
with the combined prediction generator circuitry and based at least in part on predicate values prediction or the branch target prediction for the first block of code, predict a branch target location indicating a second block of code located at one of the indicated one or more target instruction addresses; and
continue execution with the second block of code.

23. The processor of claim 22, wherein the predicting the branch target location comprises following a path through a prediction control flow graph for the first block of code to identify the branch target location.

24. The processor of claim 23, wherein the processor is further configured to generate, for respective blocks of code in a computer program, respective prediction control flow graphs.

25. The processor of claim 22, wherein identifying the combined prediction comprises performing a lookup of one or more predicted predicate values based on a history of past predicate values.

26. The processor of claim 25, wherein performing the lookup of the one or more predicted predicate values comprises:
performing multiple lookups of potential predicate values in parallel; and
for potential predicate values at a level n, resolving the potential predicate values using a particular predicate value at a level n−1.

* * * * *